US012665514B2

(12) United States Patent

Truong

(10) Patent No.: US 12,665,514 B2
(45) Date of Patent: Jun. 23, 2026

(54) METHOD AND DEVICE FOR RELIABLE DC-DC CONVERTING CIRCUITS

(71) Applicant: Anh Viet Truong, Ho Chi Minh (VN)

(72) Inventor: Anh Viet Truong, Ho Chi Minh (VN)

(73) Assignee: University of Technology and Engineering, Ho Chi Minh (VN)

( * ) Notice: Subject to any disclaimer, the term of this patent is extended or adjusted under 35 U.S.C. 154(b) by 0 days.

(21) Appl. No.: 19/283,084

(22) Filed: Jul. 28, 2025

(65) Prior Publication Data

US 2026/0031729 A1 Jan. 29, 2026

(51) Int. Cl.
H02M 3/158 (2006.01)

(52) U.S. Cl.
CPC ................................. H02M 3/1584 (2013.01)

(58) Field of Classification Search
CPC ............. H02M 3/1584; H02M 3/1586; H02M 3/1582; H02M 3/07; H02M 1/096; H02M 1/0009; H02M 1/0095
See application file for complete search history.

(56) References Cited

U.S. PATENT DOCUMENTS

| | | | | | |
|---|---|---|---|---|---|
| 7,535,204 | B1 * | 5/2009 | Nadimpalli | ......... | H02M 3/1584 |
| | | | | | 323/283 |
| 10,811,971 | B2 * | 10/2020 | Ke | ......... | H02M 1/096 |
| 11,264,896 | B2 * | 3/2022 | Fan | ......... | H02M 3/155 |
| 11,824,451 | B2 * | 11/2023 | Kwon | ......... | H02M 1/0009 |
| 2007/0086224 | A1 * | 4/2007 | Phadke | ......... | H02M 3/285 |
| | | | | | 363/65 |
| 2009/0168469 | A1 * | 7/2009 | Dishman | ......... | H02J 1/102 |
| | | | | | 363/65 |
| 2015/0188437 | A1 * | 7/2015 | Chan | ......... | H02M 3/1584 |
| | | | | | 363/46 |
| 2016/0261184 | A1 * | 9/2016 | Chen | ......... | H02M 3/158 |
| 2020/0235666 | A1 * | 7/2020 | Ke | ......... | H02M 1/096 |

FOREIGN PATENT DOCUMENTS

CN 103095114 B * 3/2016

OTHER PUBLICATIONS

Machine Translation (Year: 2016).*

* cited by examiner

*Primary Examiner* — Thienvu V Tran
*Assistant Examiner* — Yahveh Comas Torres

(57) ABSTRACT

The invention discloses a DC-DC voltage converter, which includes: i) a plurality of DC voltage converter circuits connected in series and in parallel, wherein each DC voltage converter circuit includes an inductor, a control switch, a diode, and a capacitor; and a plurality of control diodes arranged in parallel with the capacitor in the DC voltage converter circuit, wherein the number of diodes $ND=2N-1$ where N is the number of DC voltage converter circuits and N is a positive integer; and ii) a control circuit coupled to the control switch to operate the voltage converter when one or more control switches in the DC voltage converter circuit fail; and adjusting the conversion factor (boost factor) to always be a constant k.

16 Claims, 15 Drawing Sheets

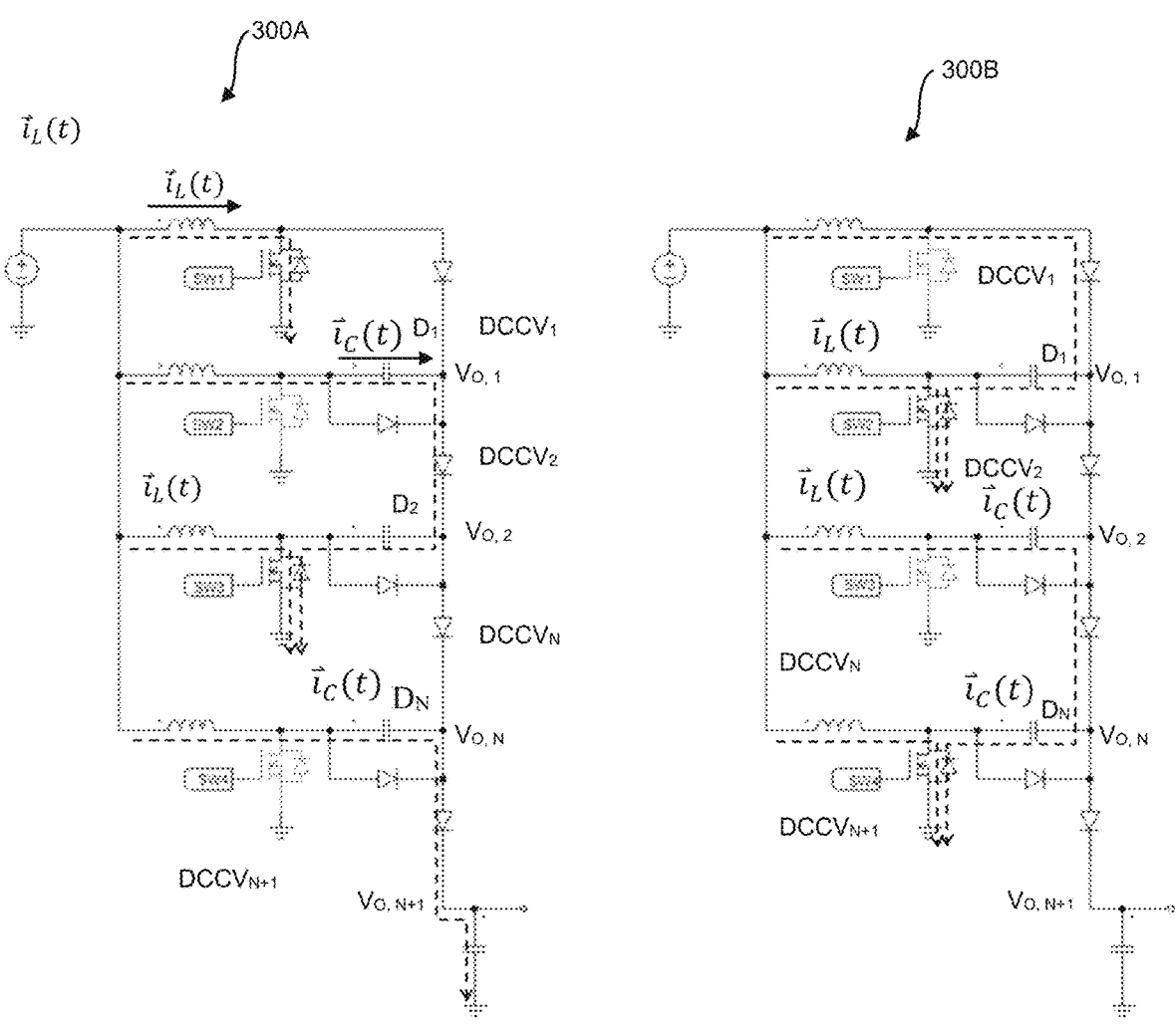
FIG. 3A                    FIG. 3B

SW1 AND SW3
ON, SW2 AND
SW4 OFF;
MOSFET FAILS

SW1 AND SW3
OFF, SW2 AND
SW4 ON; FIRST
MOSFET FAILS

700A
700B
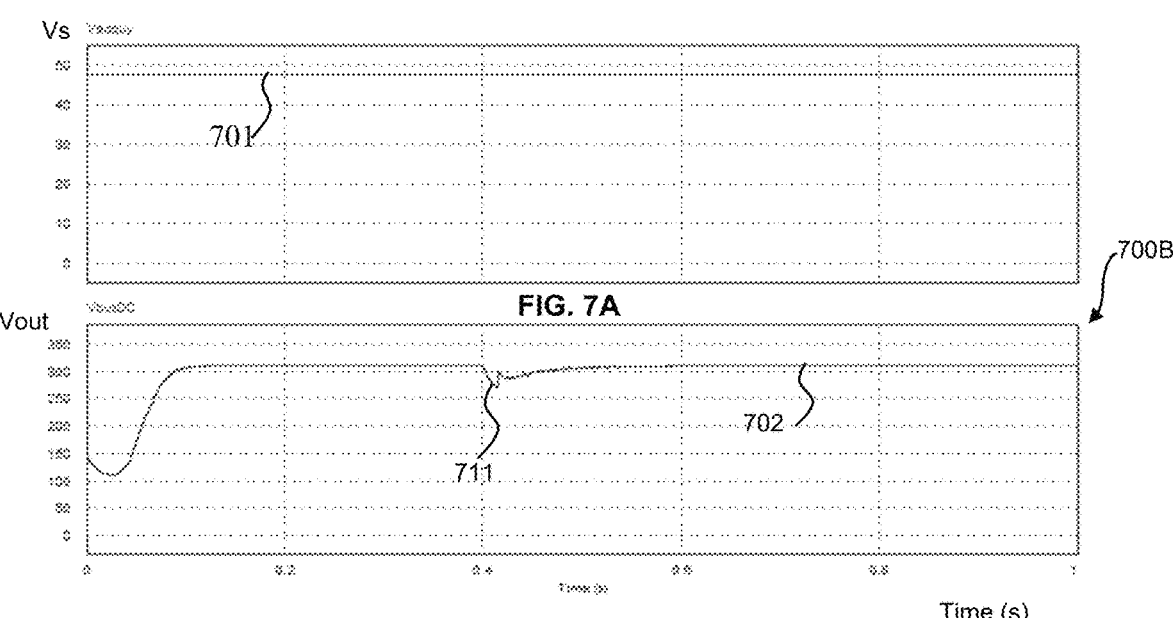
Vs
701
Vout
711
702
FIG. 7A
Time (s)
FIG. 7B

Time (s)

900A
Vs
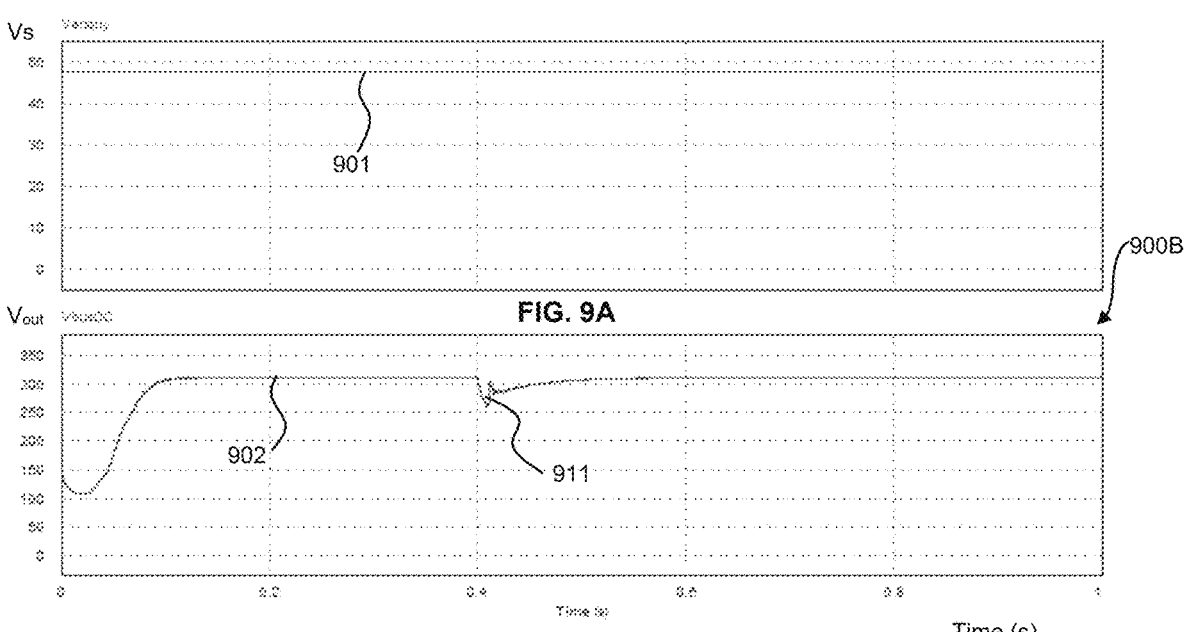
901
900B
FIG. 9A
Vout
902
911
Time (s)
FIG. 9B

1100A $V_{in}$ $V_{out}$

1100B 1102          1111

Time (s)

1300A $V_{in}$

1301

$V_{out}$ 1302     1311

1300B case     FIG. 13B

Time (s)

METHOD AND DEVICE FOR RELIABLE DC-DC CONVERTING CIRCUITS

FIELD OF THE INVENTION

The present invention relates generally to voltage converters. More specifically, the present invention relates to a step-up DC-DC converter.

BACKGROUND ART

A DC-DC step-up converter is a DC power converter that increases voltage while decreases current from an unregulated input power supply to an output load. The circuit operates on the principle of storing energy in the form of a magnetic field in an inductor and an electric field in a capacitor. The stored energy is held or released by a switching elements such as MOSFETs and diodes. The basic and well-known configuration of the converter circuit includes four electronic components: a coil, a MOSFET switch (control), a diode, and a capacitor.

Nowadays, semiconductor technology also finds its use in renewable energy sources. Therefore, DC-DC voltage converters are in great demands because of their important role in various applications including hybrid energy systems, electric vehicles, hybrid electric and gasoline/oil fuel vehicles, aerospace, satellite systems and portable electronic devices.

Y Koç et al. summarized the studies and uses of DC/DC converters in modern renewable energy systems [1]. F A. Abbas et al. also mentioned, compared and analyzed among non-isolated high-order DC/DC converters for battery applications [2]. H. Tarzamni et al. also synthesized and compared the applicability of non-isolated high step-up DC-DC converters [3].

Other prior-arts show that the current type non-isolated high-order DC/DC converters have quite complex configurations. They increase the complexity of the printed circuit layout. As such, the control of the duty cycle D for the control switches becomes complicated. This requires high programming ability and compatibility to meet the configuration of the microcontroller. In addition, the non-isolated high-order DC/DC converters use low switching frequency (25 kHz) to control the switches. Low frequency requires large inductor size. Large electrical components reduce the compactness and convenience of the DC-DC circuits. This also contributes to increased electrical losses. In addition, when one of the control switches fails, the prior-art non-isolated high-order DC/DC converters may fail.

Anh Viet Truong and colleagues came up with a DC booster circuit consisting of many cascaded booster circuits. In the cascaded booster circuits, the boost ratio is $$B = \frac{N}{1-D},$$

where N is the number of booster circuit stages, D is the control pulse (Duty Cycle) [4]. However, in this configuration, the power supply reliability as well as response capability in case of stage failure are not guaranteed. Consequently, the circuit may not operate at a very low transformer ratio when either the capacitor or control switch fails.

Thus, there is a need for a DC-DC converters that achieve both reliability and efficiency.

There is a need for DC-DC converters that achieve high conversion ratio and control range.

There is a need for a DC-DC converters that have minimal losses.

There is a need for a DC-DC converters that can remain operable when one or more control switches fail.

Yet there is a need for a DC-DC converter that can always adjust to a constant boost factor k.

The method and the circuits of the present invention meets the above needs and solve the above-described problems.

SUMMARY OF THE INVENTION

Accordingly, an object of the present invention is to provide a DC-DC converter that improves the conversion ratio and control range, improves efficiency, and reduces losses]—a DC converter which remains operational when one or more control switches fail.

Another object of the present invention is to provide a DC-DC converter that includes: a plurality of DC voltage converter phases connected in parallel in which each DC voltage converter phase comprises an inductor, a control switch, a diode, and a capacitor; and a plurality of control diodes arranged in parallel with the capacitor in the DC voltage converter circuit; and a control circuit linked to the control switch to operate the voltage converter so that when one or more control switches fail and that the conversion factor (boost factor) is always adjusted to a constant gain k.

These and other advantages of the present invention will no doubt become obvious to those of ordinary skill in the art after having read the following detailed description of the preferred embodiments, which are illustrated in the various drawing and figures.

BRIEF DESCRIPTION OF THE DRAWINGS

The accompanying drawings, which are incorporated in and form a part of this specification, illustrate embodiments of the invention and, together with the description, explain the principles of the invention.

FIG. 3A illustrates the operating principle of the DC-DC converter circuitry in the first cycle ($t_0$-$t_1$) when all DC-DC boost converter stages operate properly in accordance with an exemplary aspect of the present invention.

FIG. 3B illustrates the operating principle of the DC-DC converter circuitry in the second cycle ($t_1$-$t_2$) when all DC-DC boost converter stages operate properly in accordance with an exemplary aspect of the present invention.

FIG. 7A-FIG. 7B show the input ($V_{in}$) and output ($V_{out}$) voltage signals when the first MOSFET switch fails in accordance with an exemplary situation of the present invention.

FIG. 9A-FIG. 9B show the input ($V_{in}$) and output ($V_{out}$) signals when the second the second MOSFET switch fails in accordance with an exemplary situation of the present invention.

FIG. 13A-FIG. 13B show the input($V_{in}$) and output ($V_{out}$) signals when the first and MOSFET switches fail in accordance to an exemplary situation of the present invention.

The figures depict various embodiments of the technology for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Within the scope of the present description, the reference to "an embodiment" or "the embodiment" or "some embodiments" means that a particular feature, structure, or element described with reference to an embodiment is comprised in at least one embodiment of the described object. The sentences "in an embodiment," "in the embodiment," or "in some embodiments" in the description do not, therefore, necessarily refer to the same embodiment or embodiments. The features, structures, or elements can be furthermore combined in any adequate way in one or more embodiments.

The present invention provides a method and device for a reliable DC-DC converter circuit. In various embodiments of the present invention, a controller circuit is installed with an algorithm, when executed, assists the DC-DC converter circuit to operate efficiently and reliably.

Figure 1:
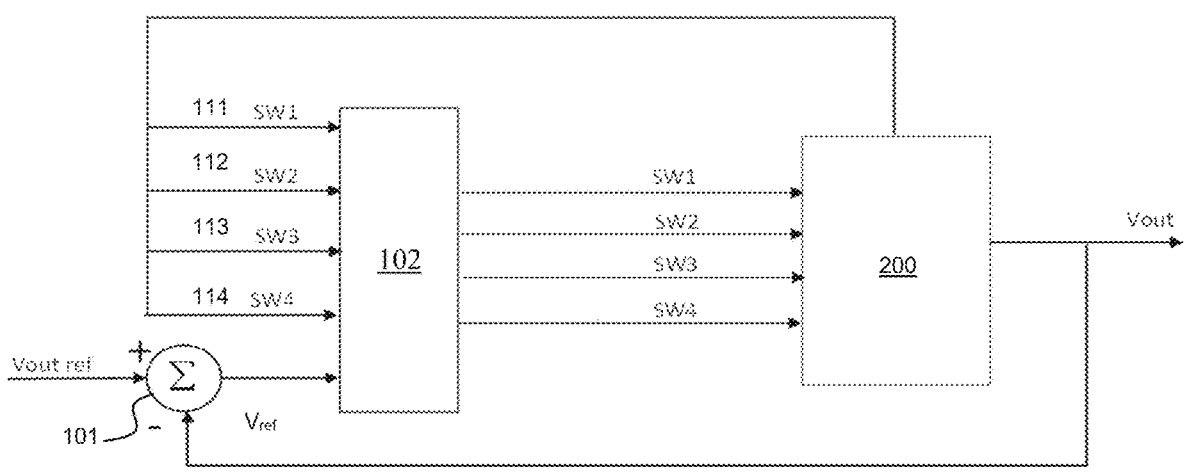
FIG. 1 illustrates a block diagram of a DC-DC converter circuitry including a control circuit connected to a DC-DC converter consisting of a plurality of DC-DC boost converter phases in accordance to an exemplary embodiment of the invention.

Now referring to FIG. 1, a block diagram of a DC-DC converter circuitry 100 including a controller circuit in accordance to an exemplary embodiment of the invention is illustrated. DC-DC converter circuitry 100 includes a summer circuit 101, a controller circuit 102 and a DC-DC boost converter 200. Summer circuit 101 is an operational amplifier (op-amp) designed to receive an input voltage ($V_{in}$) at its positive terminal. A feedback reference voltage ($V_{ref}$) from the output of DC-DC boost converter 200 is fed back to the negative terminal of summer circuit 101. A plurality of control signals $SW_1$ 111, $SW_2$ 112, $SW_3$ 113, and $SW_4$ 114 are input to controller circuit 102 and DC-DC boost converter 200. It is noted that in the present invention, DC-DC boost converter 200 is a DC-DC step-up (or boost) converter. However, DC-DC step-down (or buck) converters that operate in the same principle described below are within the scope of the present invention.

Continuing with FIG. 1, controller circuit 102 is a microprocessor or an application specific integrated circuit (ASIC). Controller circuit 102 contains a non-transitory proportional integral (PI) algorithm in its memory. This PI algorithm when executed will perform the following steps:
1. Step 1: Set Up the Proportional and Integral (PI) Constants:
   $k_p$=0.000008: proportional gain.
   $k_j$=0.00000002: integral gain.
2. Step 2: Declare Variables:
   $V_{bus}$: the current error of DC-DC boost converter.
   $V_{busprev}$: the previous error of the system (to calculate the integral component).
   Find the integral value of the error.
   $V_{ref}$=311: reference voltage value of DC-DC boost converter.
   k=300: overall gain.
3. Step 3: Calculate the Error
   $V_{bus}$=$V_{ref}$-$x_1$: calculate the error by subtracting the measured voltage value ($x_1$) from the reference voltage value.
4. Step 4: Calculate the Integral Component:
   integral=integral+$V_{bus}$*$k_i$+$V_{busprev}$*$k_i$: Add the current error and the previous error, then multiply by the integral gain.
5. Step 5: Update the Previous Error:

$V_{busprev}=V_{bus}$: save the current error value for use in the next calculation.

6. Step 6: Calculate the Control Signal ($y_1$):

$y_1=(V_{bus}*k_p)$+integral: multiply the error by the proportional gain and add the integral component.

7. Step 7: Limit the Control Signal:

if ($y_1$>0.8) $y_1$=0.8: If the control signal exceeds 0.8, limit it to 0.8.

if ($y_1$<0.2) $y_1$ =0.2: If the control signal is less than 0.2, limit it to 0.2.

8. Step 8: Amplify the Control Signal:

$y_1=y_1*k$: multiply the control signal with the overall amplification factor $$y_2 = x_2$$

$$y_3 = x_3$$

$$y_4 = x_4$$

The above steps are implemented by the following programming codes stored in controller circuit 102. Please refer to FIG. 15 for more details.

```
#define kp 0.000000
#define ki 0.00000002
static double vbus;
static double integral;
static double ref=311;
double k=-300;
Vbus=vref-x1;
integral=integral+Vbus*ki+Vbusprev*ki
Vbusprev=Vbus;
y1=Vbus*kp)+integral;
if(y1>0.8)
y1=0.8;
if(y1<0.2)
y1=y1*k;
y2=y1*k;
y2=x2;
y3=x3;
y4=x4;
```

Figure 2:
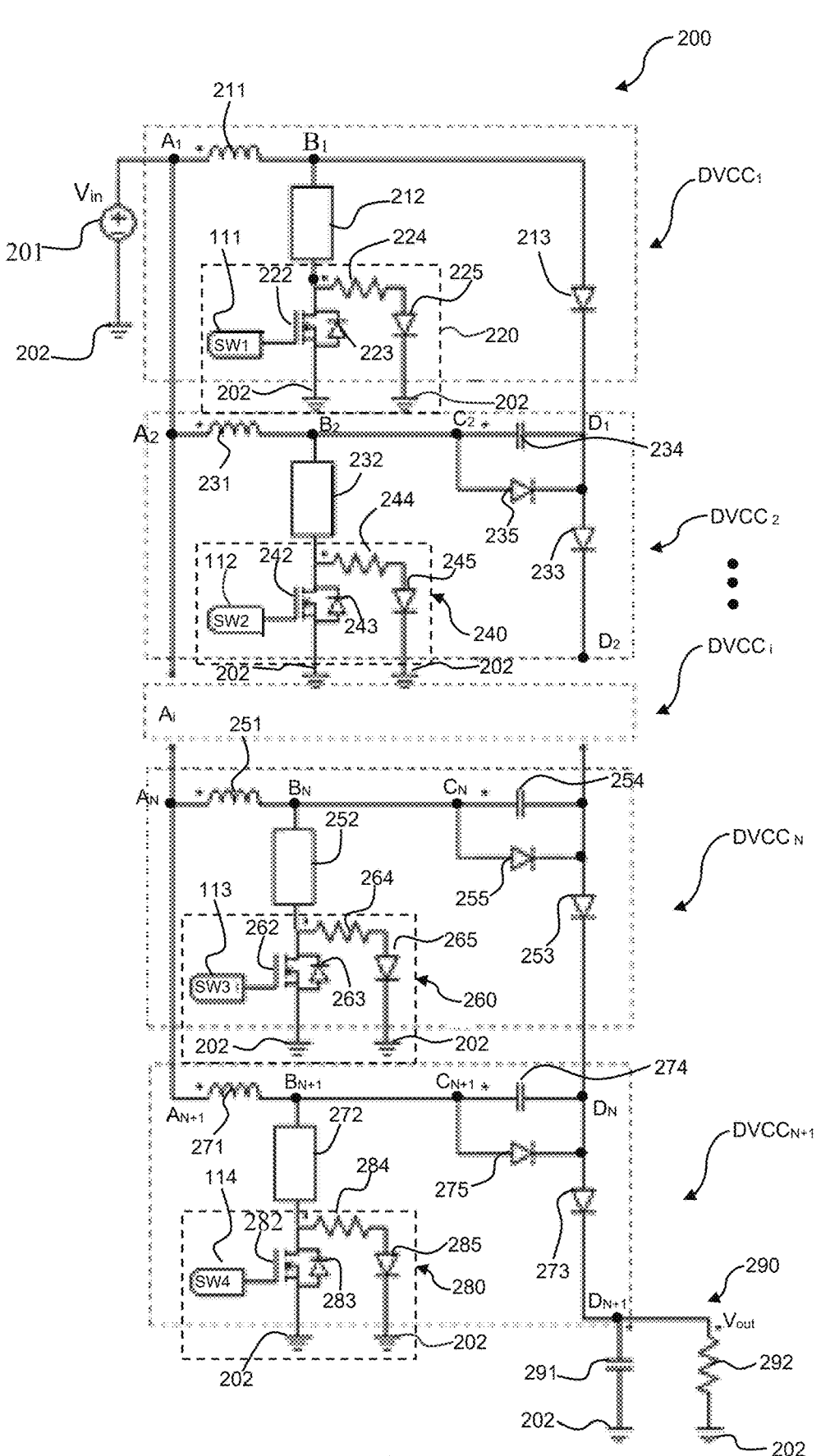
FIG. 2 shows a schematic diagram of DC-DC converter comprising a plurality of DC-DC boost converter phases in accordance to an exemplary embodiment of the invention.

Next referring to FIG. 2, a schematic diagram of a DC-DC step-up (boost) converter 200 in accordance to an exemplary embodiment of the invention is illustrated. DC-DC boost converter 200 (hereinafter referred to as converter 200) includes N boost converter stages $DVCC_1$, $DVCC_2$, ..., $DVCC_N$, and $DVCC_{N+1}$ coupled together in parallel, where N is a positive integer. The topology of each $DVCC_1$-$DVCC_{N+1}$ is described below.

Structurally, DC-DC boost converter stage $DCCV_1$ includes an input terminal at node $A_1$ and an output terminal at node $D_1$. An input voltage $V_{in}$ 201 is connected to an inductor 211 at node $A_1$. An electrical fuse 212 is connected to the output end of inductor 211 at node $B_1$. The output of electrical fuse 212 is connected to a switching circuitry 220. Switching circuitry 220 includes a resistor 224 which is connected in series to a photo diode 225. The anode of photo diode 225 is connected to an electrical ground 202. The output of electrical fuse 212 is also connected to a drain terminal of a MOSFET switch 222. The gate of MOSFET switch 222 is connected to a first switching control signal $SW_1$ 111. The source of MOSFET 222 is connected to electrical ground 202. A body diode 223 is shown across the source-drain of MOSFET switch 222. The output terminal of inductor 211 at node $B_1$ is connected to a diode 213. The anode of diode 213 forms an output terminal at node $D_1$.

Continuing with FIG. 2, DC-DC boost converter stage $DCCV_2$ includes an input terminal at node $A_2$ and an output terminal at node $D_2$. Input terminal at node $A_2$ is connected to node $A_1$ which is connected to an inductor 231. An electrical fuse 232 is connected to the output end of inductor 231 at node $B_2$. The output of electrical fuse 232 is connected to a switching circuitry 240. Switching circuitry 240 includes a resistor 244 which is connected in series to a photodiode 245. The anode of photodiode 245 is connected to an electrical ground 202. The output of electrical fuse 232 is also connected to a drain terminal of a MOSFET switch 242. The gate of MOSFET 242 is connected to second switching control voltage $SW_2$ 112. The source of MOSFET 242 is connected to electrical ground 202. A body diode 243 is shown across the source-drain of MOSFET switch 242. The output terminal of inductor 231 is connected to a capacitor 234 and also to a diode 235 at node $C_2$. The outputs of both capacitor 234 and diode 235 are connected to a second diode 233. The anode of second diode 233 forms an output terminal at node $D_2$.

Still referring to FIG. 2, DC-DC boost converter stage $DCCV_N$ includes an input terminal at node $A_N$ and an output terminal at node DN. Input terminal at node $A_N$ is connected to previous node $A_1$ which is connected to an inductor 251. An electrical fuse 252 is connected to the output end of inductor 251 at node BN. The output of electrical fuse 252 is connected to a switching circuitry 260. Switching circuitry 260 includes a resistor 264 which is connected in series to a photodiode 265. The anode of photodiode 265 is connected to an electrical ground 202. The output of electrical fuse 252 is also connected to a drain terminal of a MOSFET switch 262. The gate of MOSFET switch 262 is connected to third switching control voltage $SW_3$ 113. The source of MOSFET switch 262 is connected to electrical ground 202. A body diode 263 is shown across the source-drain of MOSFET switch 262. The output terminal of inductor 251 is connected to a capacitor 254 and also to a first diode 255 at node $C_N$. The outputs of both capacitor 254 and first diode 255 are connected to second diode 253. The anode of second diode 253 forms an output terminal at node DN.

Still referring to FIG. 2, DC-DC converter stage $DCCV_{N+1}$ includes an input terminal at node $A_{N+1}$ and an output terminal at node $D_{N+1}$. Input terminal at node $A_{N+1}$ is connected to previous node $A_N$ which is connected to an inductor 271. An electrical fuse 272 is connected to the output end of inductor 271. The output of electrical fuse 272 is connected to a switching circuitry 280. Switching circuitry 280 includes a resistor 284 which is connected in series to a photodiode 285. The anode of photodiode 285 is connected to an electrical ground 202. The output of electrical fuse 272 is also connected to a drain terminal of a MOSFET switch 282. The gate of MOSFET 282 is connected to fourth control voltage $SW_4$ 114. The source of MOSFET switch 282 is connected to electrical ground 202. A body diode 283 is shown across the source-drain of MOSFET 282. The output terminal of inductor 271 is connected to a capacitor 274 and also to a first diode 275 at node $D_{N+1}$. The outputs of both capacitor 274 and first diode 275 are connected to second diode 273 at node $C_{N+1}$. The anode of second diode 273 forms an output terminal at node $D_{N+1}$. Output terminal node $D_{N+1}$ is connected to an output stage 290 which includes a capacitor 291 which is connected in parallel to a load resistor 292. The other terminals of output capacitor 291 and load resistor 292 are connected to electrical ground 202.

In operation, because of the above topography of $DVCC_1$, $DCCV_2, \ldots, DCCV_N$, and $DCCV_{N+1}$, boost converter 200 of the present invention achieves a constant duty cycle even though (N−1) DCCV stages fail. When any of MOSFET switches 222, 242, 262, and 282 fail, respective photodiodes 225, 245, 265, and 285 turn ON signaling the failure of respective MOSFET switches 222, 242, 262, and 282.

Converter circuit 200 has a constant gain k:

$$k = \frac{V_{out}}{V_s} = \frac{N}{1-D},$$

where D is duty cycle, any consecutive $SW_1$ 111 and $SW_2$ 112 and $SW_3$ 113 and $SW_4$ 114 are driven 180 degrees out of phase, and N is the number of DC-DC boost converter stages. For non-limiting examples, N in the present disclosure is set to 4.

Referring next to FIG. 3A, the operating principle of the DC-DC boost converter circuit as any of consecutive pairs $SW_1$ 111, $SW_2$ 112 $SW_3$ 113 and $SW_4$ 114 is driven 180 degree out of phase in accordance with an exemplary aspect of the present invention is illustrated. It will be shown that irrespective of how many DVCC stages fail, the gain of converter circuit 200 is always constant and equal to $$k = \frac{V_{out}}{V_s} = \frac{N}{1-D},$$

where k is the voltage gain of the converter 200, $V_{out}$ is the output voltage at node $D_{N+1}$ of the final stage $DVCC_{N+1}$, $V_{in}$ is the input voltage, D is the duty cycle. Duty cycle D is the ratio of the time the MOSFET switch is turned ON to the total switching period T. Please see FIG. 4A.

To arrive at the desired objective of the present invention, first consider the first stage DC-DC boost converter $DCCV_1$. During the on time the inductor current increases from its minimum value toward its maximum value. In other words, the stored energy in the inductors 221 increases during the time the switch is in the closed position. During the off time, $T_{OFF}=(1-D)T$, the switch is open and the inductor current is directed toward the load via directional diode 213. The inductor current $\vec{I_l}(t)$ therefore charges capacitor 234 and supplies the load current. Diode 213 blocks not only the current flow toward the source when first control signal $SW_1$ 111 is in the closed position but also stops the output voltage from appearing across the closed switch. Inductor 211 also helps control the percent current ripple and determines whether or not the circuit is operating in the continuous conduction mode. Capacitor 234 provides the filtering action by providing a path for the harmonic currents away from the load. In addition, its value is large enough so that the output voltage ripple is very small.

The analysis begins when the inductor current $\vec{I_l}(t)$ is at its minimum and the switch $SW_1$ 111 is closed at t=0. The differential equation for the inductor current, for $0 \leq T_{ON}=DT$, and its solution are:

$$L\frac{di_L(t)}{dt} = V_{in}$$

-continued $$i_L(t) = \frac{V_{in}}{L}t + I_{L,min}$$

According to this equation, the inductor current increases linearly and attains its maximum value $I_{Lmax}$ as $t=T_{ON}=DT$ such that:

$$I_{L,max} = \frac{V_{in}}{L}DT + I_{L,min}$$

Defining the change in the current from its minimum to maximum value as the peak to-peak current ripple $\Delta I_L$, the above equation yields an expression for $\Delta I_L$ as:

$$\Delta I_L = I_{L,max} - I_{L,min} = \frac{V_{in}}{L}DT$$

As soon as the inductor current reaches its maximum value, the switch $SW_1$ is opened. The inductor current now begins to supply the load current and charge the capacitor. The corresponding differential equation for $T_{ON} \leq t \leq T$ is:

$$L\frac{di_L}{dt} = V_{in} - V_{out}$$

The solution of this equation yields $$i_L(t') = \frac{V_{in} - V_{out}}{L}(t - DT) + I_{L,max}$$

As per this equation, the inductor current $\vec{I_l}(t)$ decreases linearly from its maximum value at $t=T_{ON}$ to its minimum value as t=T, such that $$i_{L,min} = \frac{V_{in} - V_{out}}{L}(1 - D)T + I_{L,max}$$

The peak-to-peak current ripple is:

$$\Delta I_L = I_{L,max} - I_{L,min} = -\frac{V_{in} - V_{out}}{L}(1 - D)T$$

Two formulas found for the current ripple $\Delta I_L$ must be the same. Equating the two equations, the following is obtained $$\frac{V_{in}}{L}DT = -\frac{V_{in} - V_{out}}{L}(1 - D)T$$

This equation upon simplification yields, $V_{o,1}$ at node $D_1$:

$$V_{out} = \frac{V_{in}}{1 - D}$$

Referring again to FIG. 2 and FIG. 3A, with N stages DC-DC boost converter circuit 200. In the first cycle, $SW_1$ is ON, $SW_2$ is OFF, $SW_3$ is ON, and $SW_4$ is OFF. In first stage $DCCV_1$, inductor 211 is charged to $$V_{o,1} = \frac{V_{in}}{1-D};$$

in second stage $DCCV_2$, capacitor is charged up to $$V_{o,2} = \frac{V_{in}}{1-D};$$

in $DCCV_N$ stage, inductor 251 is charged up to $$V_{o,N} = \frac{V_{in}}{1-D};$$

and in $DCCV_{N+1}$ stage, capacitor is charged to $$V_{o,N+1} = \frac{V_{in}}{1-D}.$$

The output voltage $V_{out}$ at output capacitor 291 at node $D_{N+1}$ is always:

$$V_{out} = \frac{NV_{in}}{1-D}$$

$$V_{out} = N\frac{V_{in}}{1-D}$$

because the output voltage ($V_O$) at node $D_{N+1}$ is always the sum of $V_{o,1}$ at node $D_1$, $V_{o,2}$ at node $D_2$; $V_{o,N}$ at node $D_N$; and $V_{o,N+1}$ at node $D_{N+1}$.

Referring to FIG. 3B and FIG. 2, in the next cycle, $SW_1$ 111 is OFF, $SW_2$ 112 is ON, $SW_3$ 113 is OFF, and $SW_4$ 114 is ON. In first stage $DCCV_1$, capacitor 234 is charged to $$V_{o,1} = \frac{V_{in}}{1-D};$$

in second stage $DCCV_2$, inductor 231 is charged up to $$V_{o,2} = \frac{V_{in}}{1-D};$$

in $DCCV_N$ stage, capacitor 254 is charged up to $$V_{o,N} = \frac{V_{in}}{1-D};$$

and in $DCCV_{N+1}$ stage, inductor 271 is charged to $$V_{o,N+1} = \frac{V_{in}}{1-D}.$$

The output voltage $V_{out}$ at output capacitor 291 at node $D_{N+1}$ is always:

$$V_{out} = \frac{NV_{in}}{1-D}.$$

$$V_{Out} = N\frac{V_S}{1-D}$$

because the output voltage ($V_{out}$) at node $D_{N+1}$ is always the sum of $V_{o,1}$ at node $D_1$, $V_{o,2}$ at node $D_2$; $V_{o,N}$ at node $D_N$; and $V_{o,N+1}$ at node $D_{N+1}$.

Figures 4A, 4B:
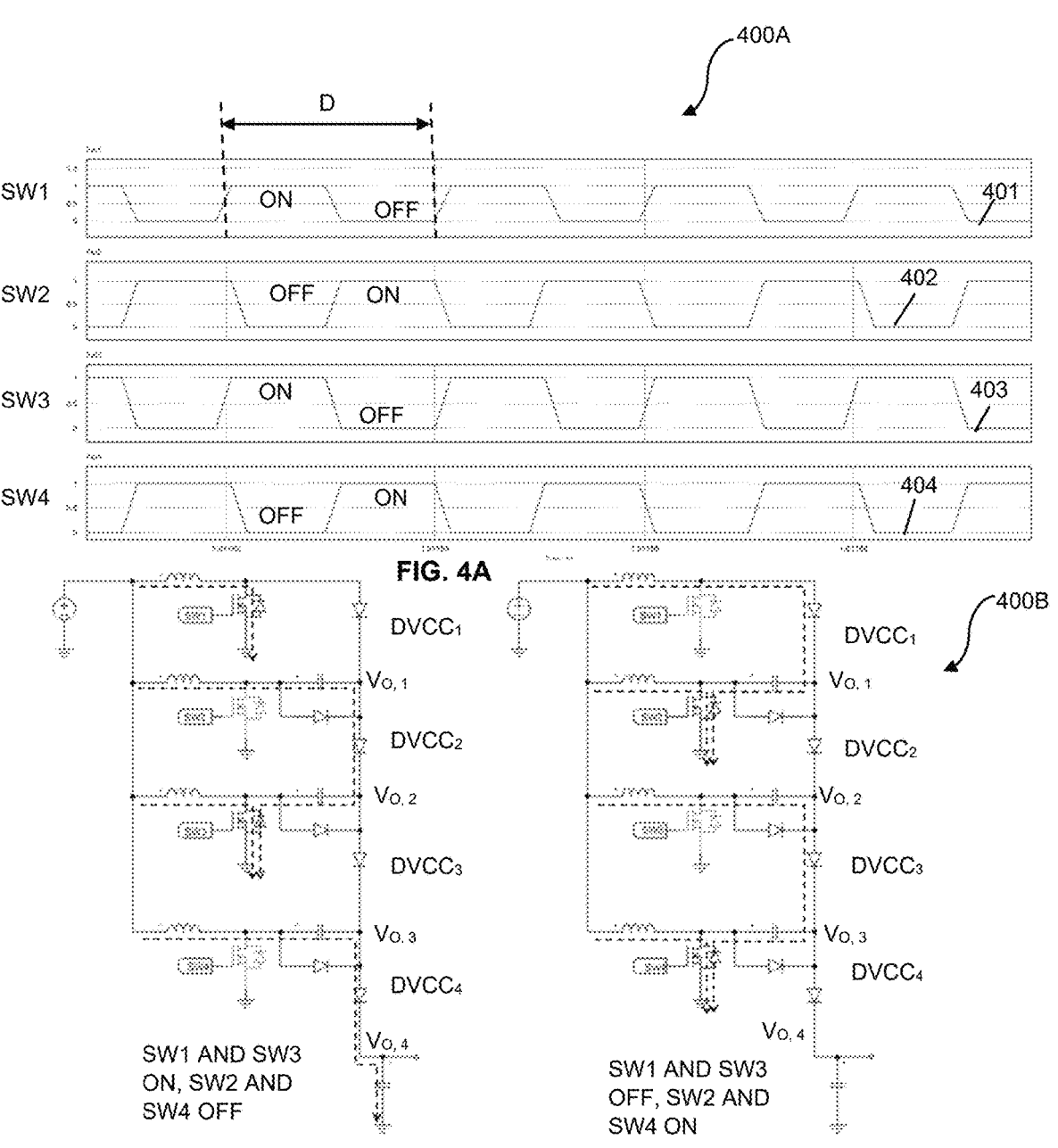
FIG. 4A shows the control signals ($SW_1$-$SW_4$) input to the MOSFETs in accordance with an exemplary aspect of the invention.
FIG. 4B illustrates the operation of the DC-DC converter when all DC-DC boost converter stages operate properly in accordance with to an exemplary aspect of the present invention

Next referring to FIG. 4A and FIG. 4B, the operations of the DC-DC converter when all four stages operate properly without fail is illustrated. In FIG. 4A, graphs 400A show switching control signals $SW_1$ 401, $SW_2$ 402, $SW_3$ 403, and $SW_4$ 404. In many preferred embodiments of the present invention, $SW_1$ and $SW_2$ are 180° out of phase, $SW_3$ and [$SW_4$ are 180° out of phase. FIG. 4B shows the operation of converter circuit 200 during the first cycle [$t_0$, $t_1$] and second cycle [$t_1$, $t_2$]. As described above in FIG. 3A-FIG. 3B, $V_{out}$ is always $$V_{out} = 4\frac{V_S}{1-D} \text{ or } D = 1 - \frac{NV_{in}}{V_{out}}.$$

Controller circuit 102 only interferes when it senses by feedback reference signal $V_{ref}$ that converter circuit 200 fails to operate. The PI algorithm shown above and in FIG. 15 are used.

Figures 5A, 5B:
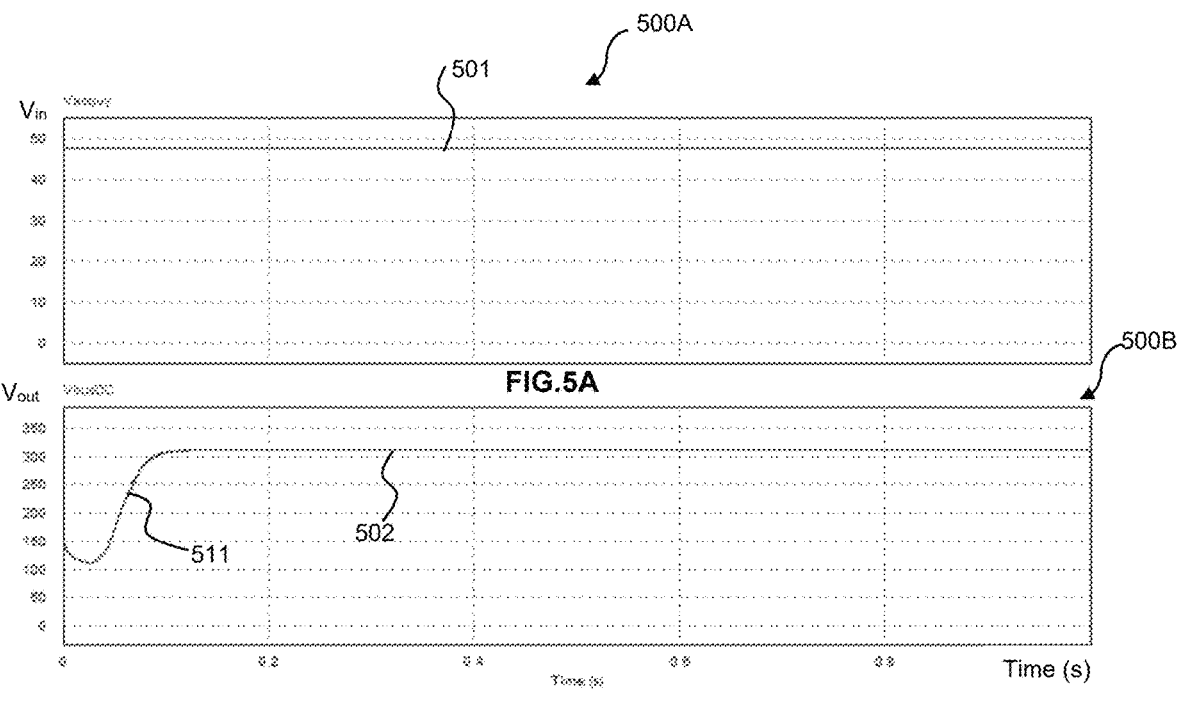
FIG. 5A-FIG. 5B show the input ($V_{in}$) and output voltages ($V_{out}$) when all DC-DC boost converter stages operate properly in accordance to an exemplary aspect of the present invention.

FIG. 5A-FIG. 5B, a graph 500 of $V_{in}$ and $V_{out}$ when all stages operate properly is illustrated. $SW_1$-$SW_4$ control pulses of N control switches when the DC-DC converter operates properly. In FIG. 5A, a $V_{in}$ graph 501 is a constant DC voltage. In FIG. 5B, $V_{out}$ graph 502 is also a DC voltage at a higher voltage level with gain k. A voltage drop 511 indicates the time it takes to charge the inductors and capacitors of converter 200.

Figures 6A, 6B:
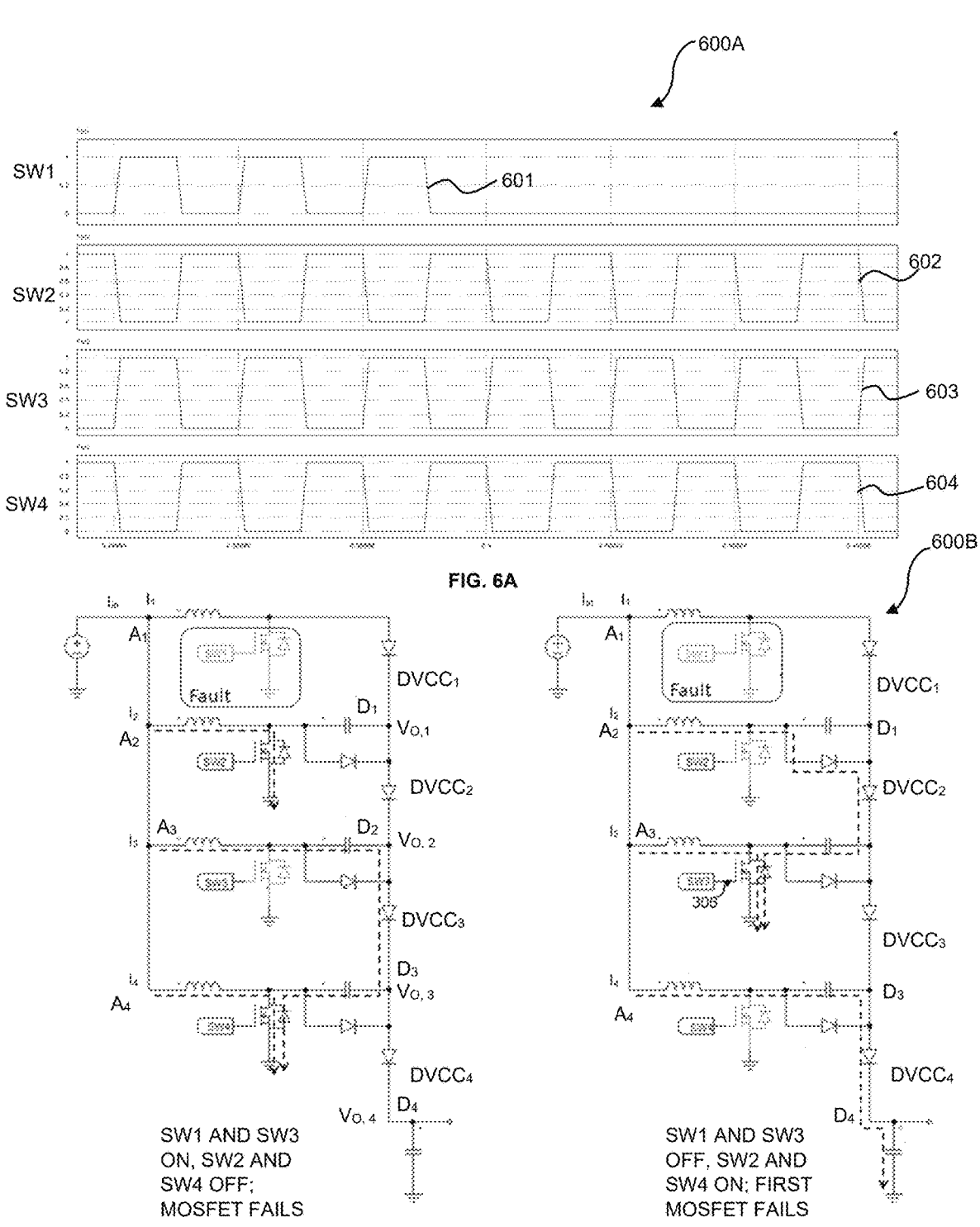
FIG. 6A illustrates control signals of N control switches when the first switch (e.g., the MOSFET) fails in accordance with an exemplary situation of the present invention.
FIG. 6B illustrates the operation of the DC-DC converter when the first MOSFET switch fails in accordance with an exemplary situation of the present invention.

Referring now to FIG. 6A, switching control pulses $SW_1$-$SW_4$ 600A with duty cycle D when the first MOSFET fails in accordance to an exemplary aspect of the invention is illustrated. As shown, $SW_1$ 601 drops to 0V after the third pulse. This is equivalent to MOSFET 222 fails after the third pulse.

In FIG. 6B, when MOSFET 222 fails, inductor 211 is not charged up. That is no current $\vec{I}_i(t)$ flows through inductor 211. However, capacitor 234 is charged up because $V_{in}$ is also applied at node $A_2$. In switching circuitry 220, MOSFET 222 is OFF and photodiode 225 is turned ON signaling that MOSFET 222 has failed. Diode 213 is ON, charging capacitor 234. The output voltage $V_{o,1}$ at node $D_1$ is still $$V_{o,1} = \frac{V_{in}}{1-D}.$$

The output voltage $V_{o,2}$ at node $D_2$ is still $$V_{o,2} = \frac{V_{in}}{1-D}.$$

Similarly, The output voltage $V_{o,3}$ at node $D_3$ is still $$V_{o,3} = \frac{V_{in}}{1-D}.$$

The output voltage $V_{o,4}$ at node $D_4$ is still $$V_{o,4} = \frac{V_{in}}{1-D}.$$

Therefore, the final output voltage is still $$V_{out} = \frac{4V_{in}}{1-D}.$$

FIG. 7A-FIG. 7B, a graph 700 of $V_{in}$ and $V_{on}$t voltages when the first MOSFET fails is shown. In FIG. 7A, a $V_{in}$ graph 701 is a constant DC voltage. In FIG. 7B, a $V_{out}$ graph 702 is also a DC voltage at a higher voltage level because of gain k. A ringing 711 is manifested by currents fluctuations within first DC-DC boost converter stage DVVC$_1$.

Figures 8A, 8B:
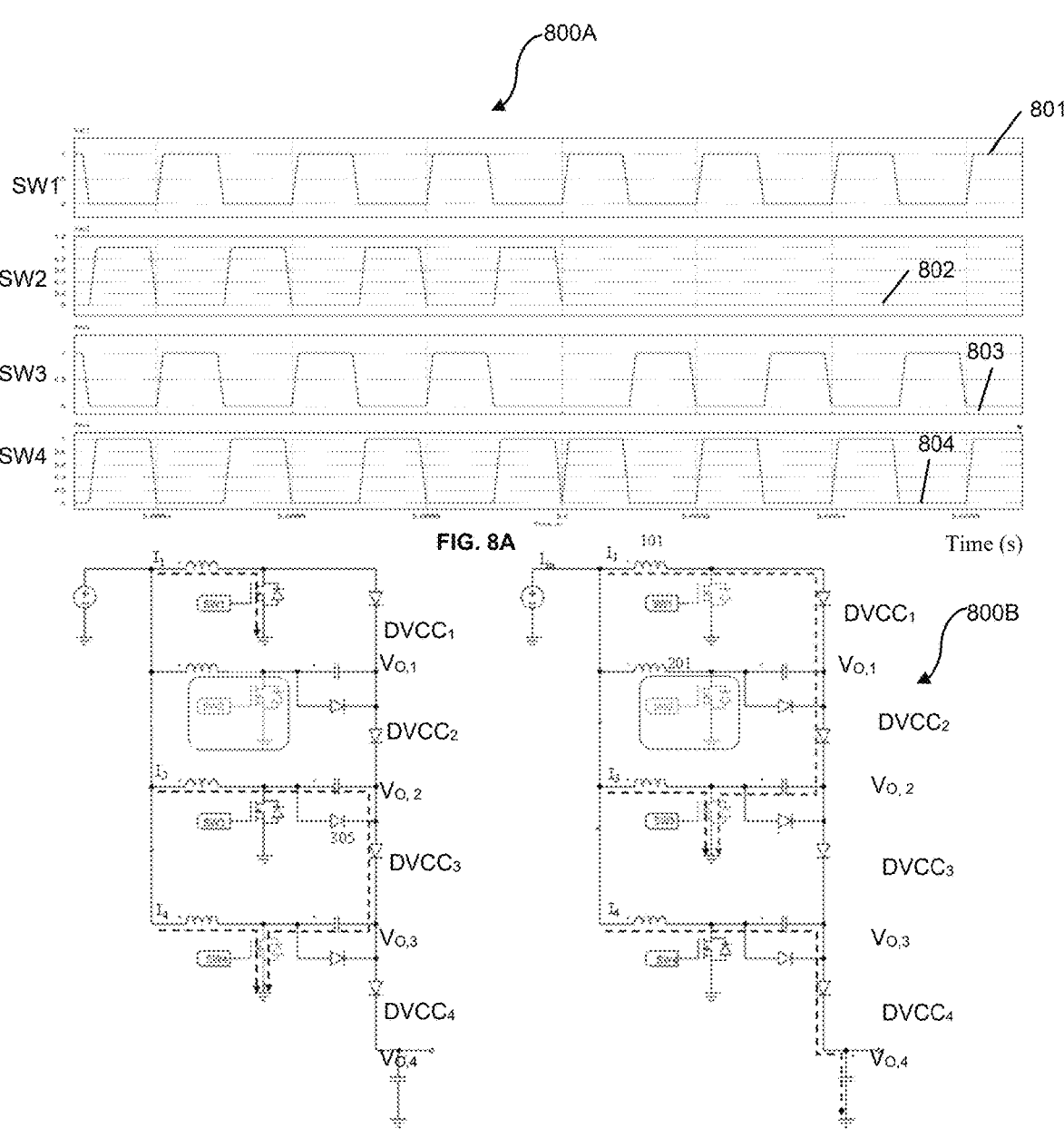
FIG. 8A illustrates control signals ($SW_1$-$SW_4$) when the second MOSFET switch fails in accordance to an exemplary situation of the present invention.
FIG. 8B illustrates the operations of the DC-DC boost converter when the second MOSFET switch fails in accordance with an exemplary situation of the present invention.

Next, an exemplary situation when the second MOSFET fails is illustrated in FIG. 8A-FIG. 8B. In FIG. 8A, SW1-SW4 switching control pulses SW1-SW4 800A in case second MOSFET 242 fails are shown. SW1 802 drops to 0V after the fourth pulse. This is equivalent to MOSFET switch 242 fails.

In FIG. 8B, when MOSFET switch 242 fails and inductor 231 is not charged up. That is no current $\vec{I_L}(t)$ flows through inductor 231. However, capacitor 234 is charged up by current $\vec{I_C}(t)$ because of directional diode 235. The output voltage $V_{o,1}$ at node $D_1$ is still $$V_{o,1} = \frac{V_{in}}{1-D}.$$

The output voltage $V_{o,2}$ at node $D_2$ is still $$V_{o,2} = \frac{V_{in}}{1-D}.$$

Similarly, The output voltage $V_{o,3}$ at node $D_3$ is still $$V_{o,3} = \frac{V_{in}}{1-D}.$$

The output voltage $V_{0,4}$ at node $D_{N+1}$ is still $$V_{o,4} = \frac{V_{in}}{1-D}.$$

Therefore, the final output voltage $$V_{out} = \frac{NV_{in}}{1-D}.$$

FIG. 9A-FIG. 9B, a graph 900 of $V_{in}$ and $V_{out}$ is illustrated. SW1-SW4 switching control pulses SW$_1$-SW$_4$ when the second MOSFET switch fails. In FIG. 9A, a $V_{in}$ graph

901 is a constant DC voltage. In FIG. 9B, a $V_{out}$ graph 902 is also a DC voltage at a higher DC voltage level because of gain k. A ringing 911 is manifested by current fluctuations within second DC-DC boost converter stage DVVC$_2$.

Figures 10A, 10B:
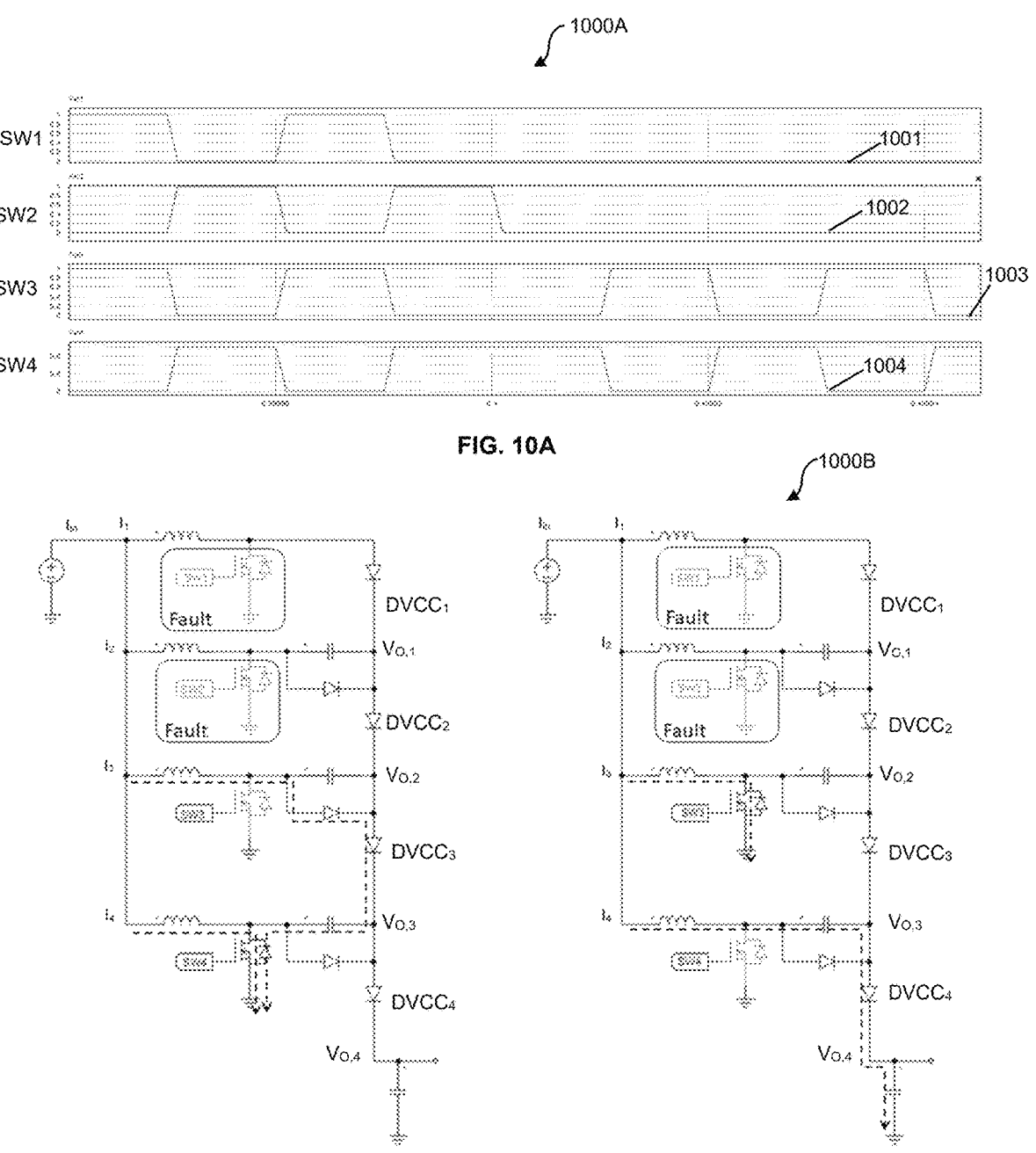
FIG. 10A illustrates control signals ($SW_1$-$SW_4$) when the first and second MOSFET switches fail in accordance with an exemplary situation of the invention.
FIG. 10B illustrates the operations of the DC-DC boost converter when the first and second MOSFET switches fail in accordance to an exemplary situation of the invention.

Now referring to FIG. 10A-FIG. 10B, an exemplary situation when the first and second MOSFET switches fail are discussed. When both first and second MOSFETs fail, the output voltage $V_{out}$ remains the same. In FIG. 10A, control pulses SW$_1$-SW$_4$ 1000A when first and second MOSFETs 222 and 242 fail are illustrated. First switching control signal SW1 1001 drops to 0V after the second pulse. Second switching control signal SW2 1002 drops to zero volt after the third pulse. This is equivalent to MOSFET 222 and 242 fail concurrently.

In FIG. 10B, when MOSFET 222 fails, inductor 211 is not charged up. That is no current $\vec{I_L}(t)$ flows through inductor 211. However, capacitor 234 is charged up by current $\vec{I_C}(t)$. The output voltage $V_{o,1}$ at node $D_1$ is still $$V_{o,1} = \frac{V_{in}}{1-D}.$$

In the second stage DVCC$_2$, the output voltage $V_{o,2}$ at node $D_2$ is still $$V_{o,2} = \frac{V_{in}}{1-D}.$$

Similarly, The output voltage $V_{o,3}$ at node $D_3$ is still $$V_{o,3} = \frac{V_{in}}{1-D}.$$

The output voltage $V_{o,4}$ at node $D_1$ is still $$V_{o,4} = \frac{V_{in}}{1-D}.$$

Therefore, the final output voltage $$V_{out} = \frac{4V_{in}}{1-D}.$$

When second MOSFET switch 242 fails the same phenomenon happened as described above in FIG. 8A-FIG. 8B;

$$V_{out} = \frac{4V_{in}}{1-D}.$$

Figures 11A, 11B:
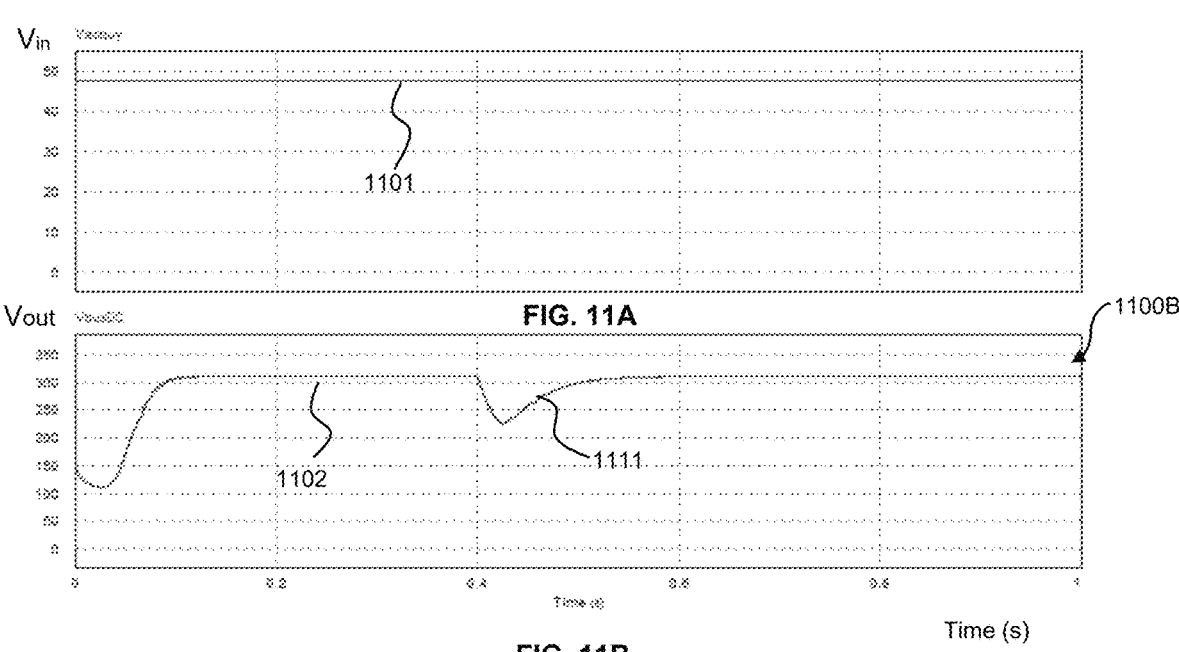
FIG. 11A-FIG. 11B show the input ($V_{in}$) and output ($V_{out}$) signals when the first and second MOSFET switches fail in accordance to an exemplary situation of the invention.

FIG. 11A-FIG. 11B, a graph 1100A of $V_{in}$ and $V_{out}$ when the first and the second MOSFETs fail is illustrated. In FIG. 11A, a $V_{in}$ graph 1101 is a constant DC voltage. In FIG. 11B, a $V_{out}$ graph 1102 is also a DC voltage at a higher voltage level with a gain k. A small voltage dip 1111 manifests the time it takes to recover from the failures of the first MOSFET switch 222 and second MOSFET switch 242.

Figures 12A, 12B:
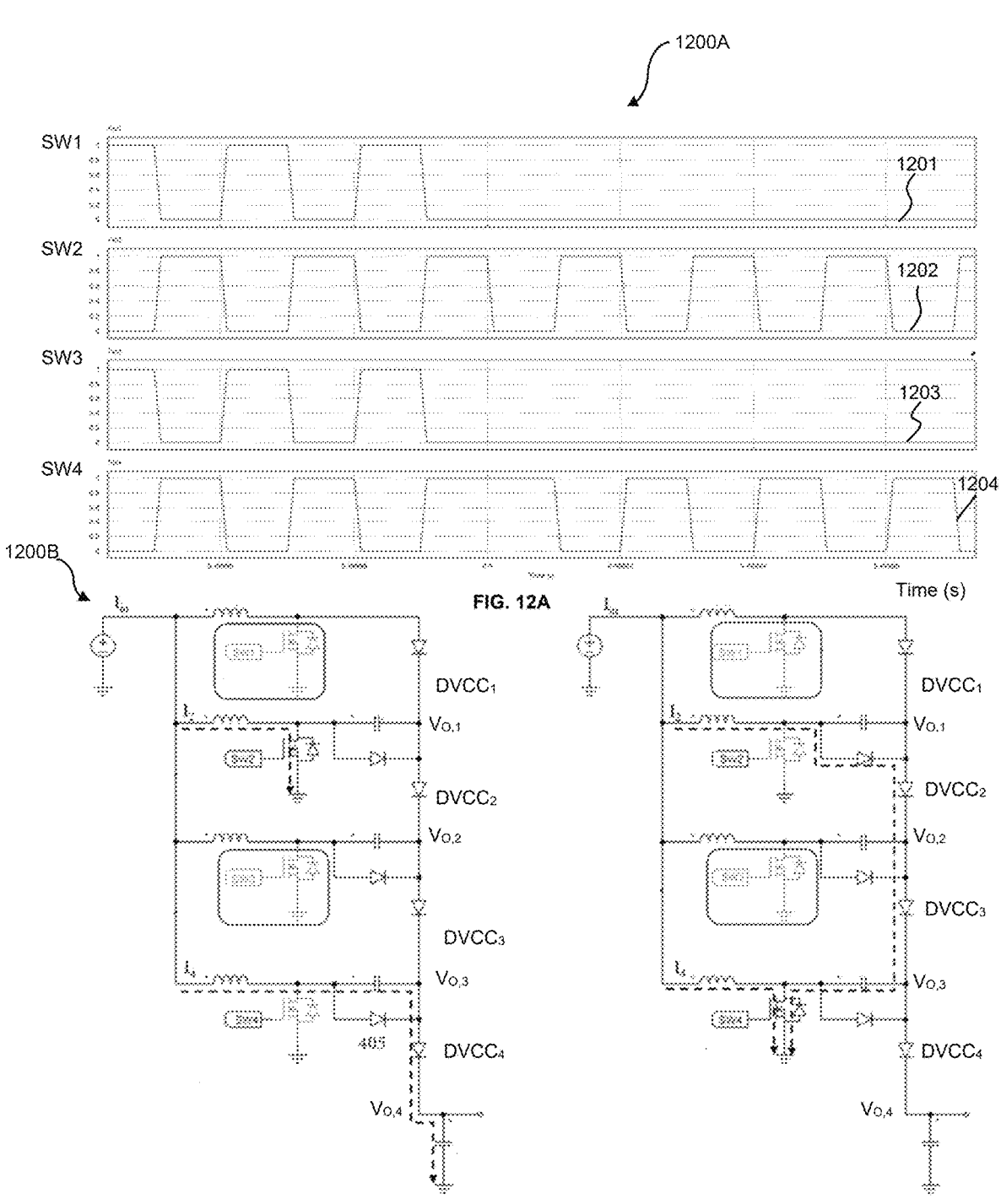
FIG. 12A illustrates control signals ($SW_1$-$SW_4$) when the first and third MOSFET switches fail in accordance to an exemplary aspect of the invention.
FIG. 12B illustrates the operations of the DC-DC boost converter when the first and third MOSFET switches fail in accordance with an exemplary situation of the invention.

Now referring to FIG. 12A, switching control pulses SW$_1$-SW$_4$ 1200A when the first and third MOSFET fail are shown. An exemplary situation where the first and the third MOSFET switch fail are shown and discussed in FIG. 12A-FIG. 12B. The output voltage $V_{out}$ is still $$V_{out} = \frac{4V_{in}}{1-D}.$$

Switching control signal 1201 drops to 0V after second pulse. Switching control signal $SW_2$ 1203 drops to zero volt after the third pulse. This is equivalent to MOSFET 222 and 262 fail at the same time.

In FIG. 12B, when MOSFET 222 fails, inductor 211 is not charged up. That is no current $\vec{I}_L(t)$ flows through inductor 211. However, capacitor 234 is charged up by current $\vec{I}_C(t)$. The output voltage $V_{o,1}$ at node $D_1$ is still $$V_{o,1} = \frac{V_{in}}{1-D}.$$

In the second stage $DVCC_2$, the output voltage $V_{o,2}$ at node $D_2$ is still $$V_{o,2} = \frac{V_{in}}{1-D}.$$

Similarly, The output voltage $V_{o,3}$ at node $D_3$ is still $$V_{o,3} = \frac{V_{in}}{1-D}.$$

The output voltage $V_{o,4}$ at node $D_4$ is still $$V_{o,4} = \frac{V_{in}}{1-D}.$$

Therefore, the final output voltage $$V_{out} = \frac{4V_{in}}{1-D}.$$

In addition, the same phenomena happens in second DC-DC boost converter stage $DVCC_3$ $$V_{o,4} = \frac{V_{in}}{1-D} \text{ and } V_{out} = \frac{4V_{in}}{1-D}.$$

Figure 13A:
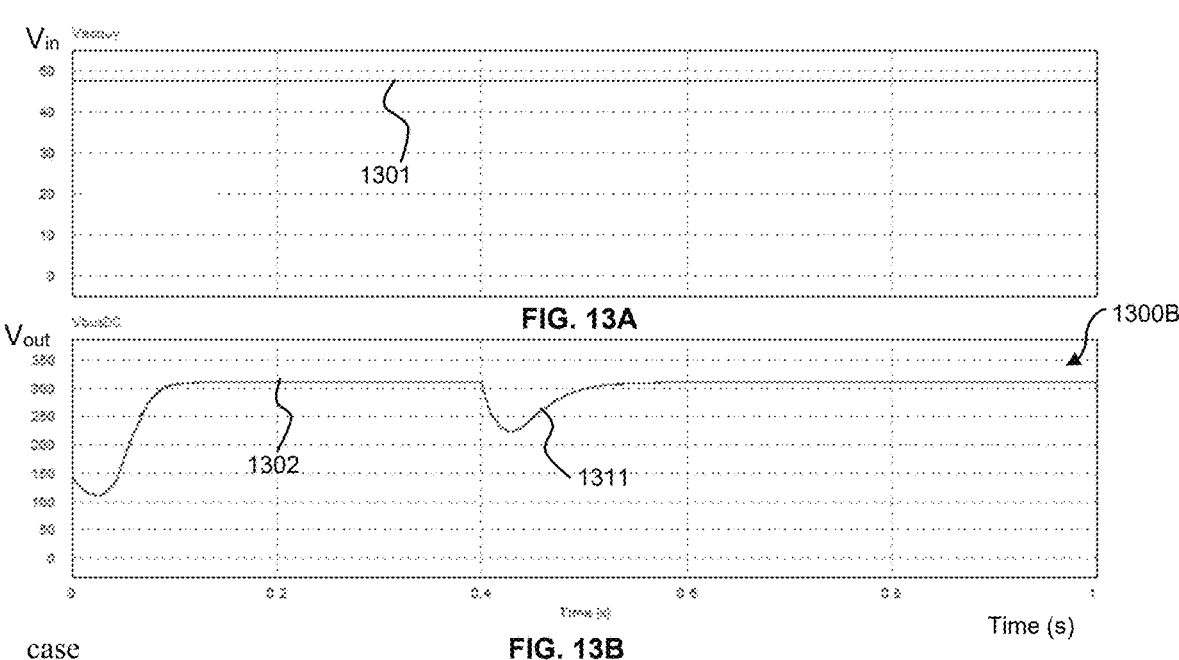

Referring to FIG. 13A-FIG. 13B, a graph 1300A of $V_{in}$ and a graph 1300B of $V_{out}$ in case first MOSFET switch and third MOSFET switch fail are illustrated. In FIG. 13A, a $V_{in}$ graph 1301 is an input constant DC voltage. In FIG. 131B, a $V_{out}$ graph 1302 is also a DC voltage at a higher voltage level. A small voltage dip 1311 is caused by the recovery time it takes to recover from the failure state to normal state of the first stage $DCCV_1$ and the third stage $DCCV_3$.

Above are exemplary cases when various MOSFETs of converter 200 fails. Table 1 below summarizes situation when at least one MOSFET operate properly. Even when all three MOSFETs fail, converter 200 still provides the same gain and voltage output $V_{out}$.

TABLE 1

| Operation of DC-DC Boost Converter When Various MOSFETs Fail are Summarized. | | | | | | | |
|---|---|---|---|---|---|---|---|
| Case No. (1) | Number of Broken Switches (2) | Status of Switching Devices: ☑ : Operating ☒ : Broken (3) | | | | Control Switches (D1 and D2 180° Out of Phase) (4) | | Duty Cycle D D1 = D2 = D (5) | Illustrating Figures |
| | | | | | | | | FIG. 2-FIG. 13 |
| | | SW 1 | SW 2 | SW 3 | SW 4 | D1 | D2 | | |
| 1 | 0 | ☑ | ☑ | ☑ | ☑ | SW 1, SW 3 | SW 2, SW 4 | $D = 1 - \frac{4V_{in}}{V_{out}}$ | FIG. 3 |
| 2 | 1 | ☒ | ☑ | ☑ | ☑ | SW 2, SW 4 | SW 3 | $D = 1 - \frac{3V_{in}}{V_{out}}$ | FIG. 4 |
| 3 | 1 | ☑ | ☒ | ☑ | ☑ | SW 1, SW 4 | SW 3 | $D = 1 - \frac{3V_{in}}{V_{out}}$ | FIG. 8 |
| 4 | 1 | ☑ | ☑ | ☒ | ☑ | SW 1, SW 4 | SW 2 | $D = 1 - \frac{3V_{in}}{V_{out}}$ | FIG. 3 |

TABLE 1-continued

Operation of DC-DC Boost Converter When Various MOSFETs Fail are Summarized.

| Case No. | Number of Broken Switches | Status of Switching Devices : ☑ : Operating ☒ : Broken | | | | Control Switches (D1 and D2 180° Out of Phase) | | Duty Cycle D D1 = D2 = D | Illustrating Figures |
|---|---|---|---|---|---|---|---|---|---|
| 5 | 1 | ☑ | ☑ | ☑ | ☒ | SW 1, SW 3 | SW 2 | $D = 1 - \dfrac{3V_{in}}{V_{out}}$ | FIG. 3 |
| 6 | 2 | ☒ | ☒ | ☑ | ☑ | SW 3 | SW 4 | $D = 1 - \dfrac{2V_{in}}{V_{out}}$ | FIG. 10 |
| 7 | 2 | ☑ | ☒ | ☒ | ☑ | SW 1 | SW 4 | $D = 1 - \dfrac{2V_{in}}{V_{out}}$ | FIG. 3 |
| 8 | 2 | ☑ | ☑ | ☒ | ☒ | SW 1 | SW 2 | $D = 1 - \dfrac{2V_{in}}{V_{out}}$ | FIG. 10 |
| 9 | 2 | ☒ | ☑ | ☑ | ☒ | SW 2 | SW 3 | $D = 1 - \dfrac{2V_{in}}{V_{out}}$ | FIG. 3 |
| 10 | 2 | ☑ | ☒ | ☑ | ☒ | SW 1 | SW 3 | $D = 1 - \dfrac{2V_{in}}{V_{out}}$ | FIG. 3 |
| 11 | 2 | ☒ | ☑ | ☒ | ☑ | SW 2 | SW 4 | $D = 1 - \dfrac{2V_{in}}{V_{out}}$ | FIG. 12-FIG. 13 |
| 12 | 3 | ☒ | ☒ | ☒ | ☑ | SW 4 | N/A | $D = 1 - \dfrac{V_{in}}{V_{out}}$ | FIG. 3 |
| 13 | 3 | ☑ | ☒ | ☒ | ☒ | SW 1 | SW 4 | $D = 1 - \dfrac{V_{in}}{V_{out}}$ | FIG. 3 |
| 14 | 3 | ☒ | ☑ | ☒ | ☒ | SW 2 | N/A | $D = 1 - \dfrac{V_{in}}{V_{out}}$ | FIG. 3 |
| 15 | 3 | ☒ | ☒ | ☑ | ☒ | SW 3 | N/A | $D = 1 - \dfrac{V_{in}}{V_{out}}$ | FIG. 3 |
| 16 | 4 | ☒ | ☒ | ☒ | ☒ | N/A | N/A | N/A | N/A |

Figure 14:
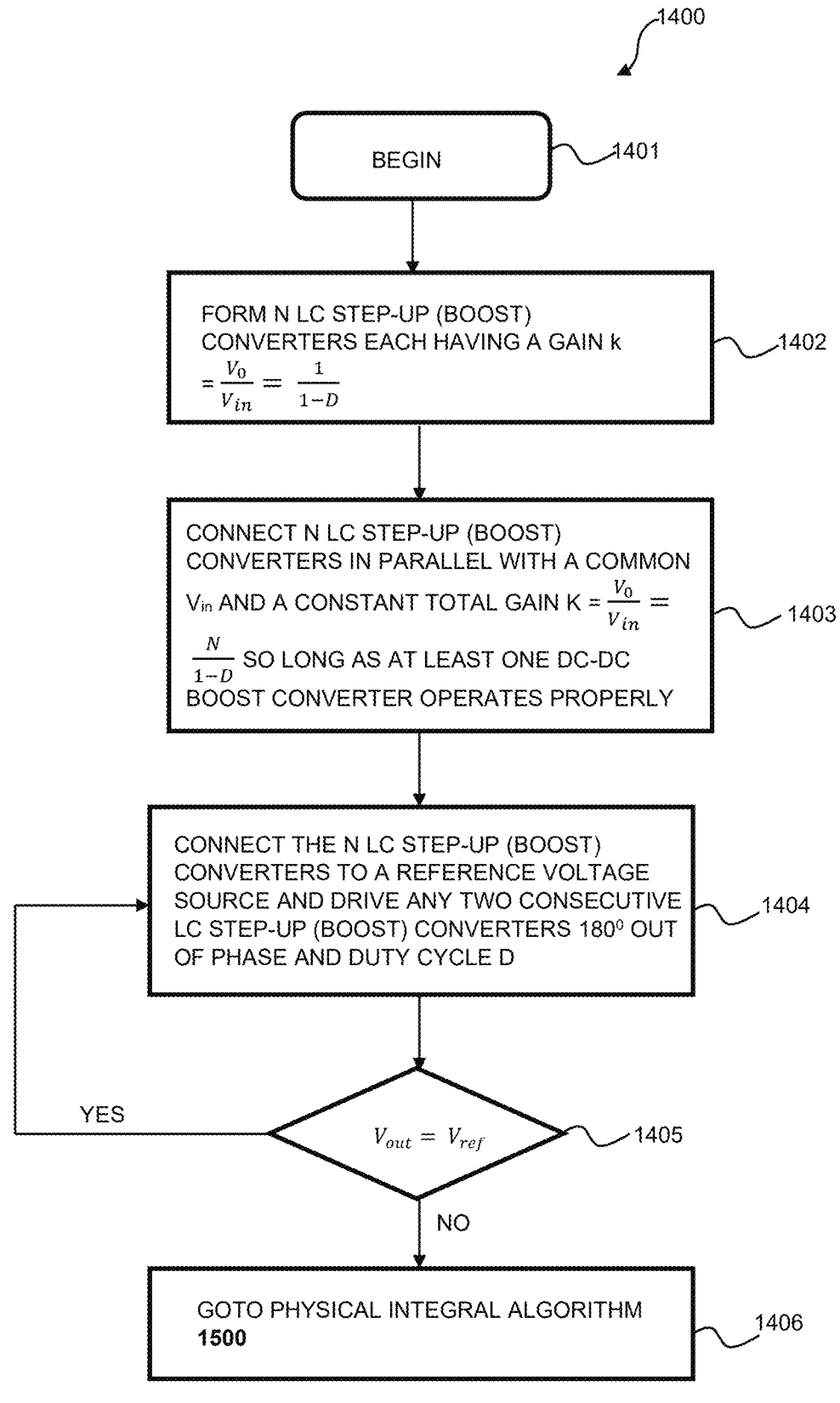
FIG. 14 shows a method for constructing a reliable DC-DC converter circuit that has a constant gain factor k as long as at least one MOSFET switches operates properly in accordance with various exemplary aspects of the present invention.

FIG. 14 shows a method 1400 for constructing a reliable DC-DC converter circuit that has a constant gain factor k as long as at least one DC-DC boost converter stage operates properly in accordance with an exemplary aspect of the present invention.

At step 1401, method 1400 begins.

At step 1402, N step-up or boost converter stages where each with a gain $$k = \frac{V_0}{V_{in}} = \frac{1}{1-D}$$

are constructed. Step 1402 is realized by forming any number of boost converter stages including first stage DVVC$_1$-DVCC$_{N+1}$ as described in FIG. 2.

At step 1403, connected N step-up or boost converter stages in parallel with a common V$_{in}$ and a constant gain $$K = \frac{V_0}{V_{in}} = \frac{N}{1-D}$$

so long as each stage operates properly. Step 1403 is realized by converter 200 as described in FIG. 2, and FIG. 3 to FIG. 13B.

At step 1404, any pair of consecutive stages are driven 180° out of phase with a signal having a duty cycle D. Step 1404 is realized by controller circuit 102 with driving voltage V$_{in}$ described in FIG. 4A-FIG. 4B to FIG. 13A-FIG. 13B.

At step 1405, whether the converter circuit operates properly. Step 1405 is realized by comparing output voltage V$_{out}$ and the reference voltage V$_{ref}$ If these two voltages are the same then converter circuit operates properly as described above.

Otherwise, at step 1406, go to algorithm 1500.

Figure 15:
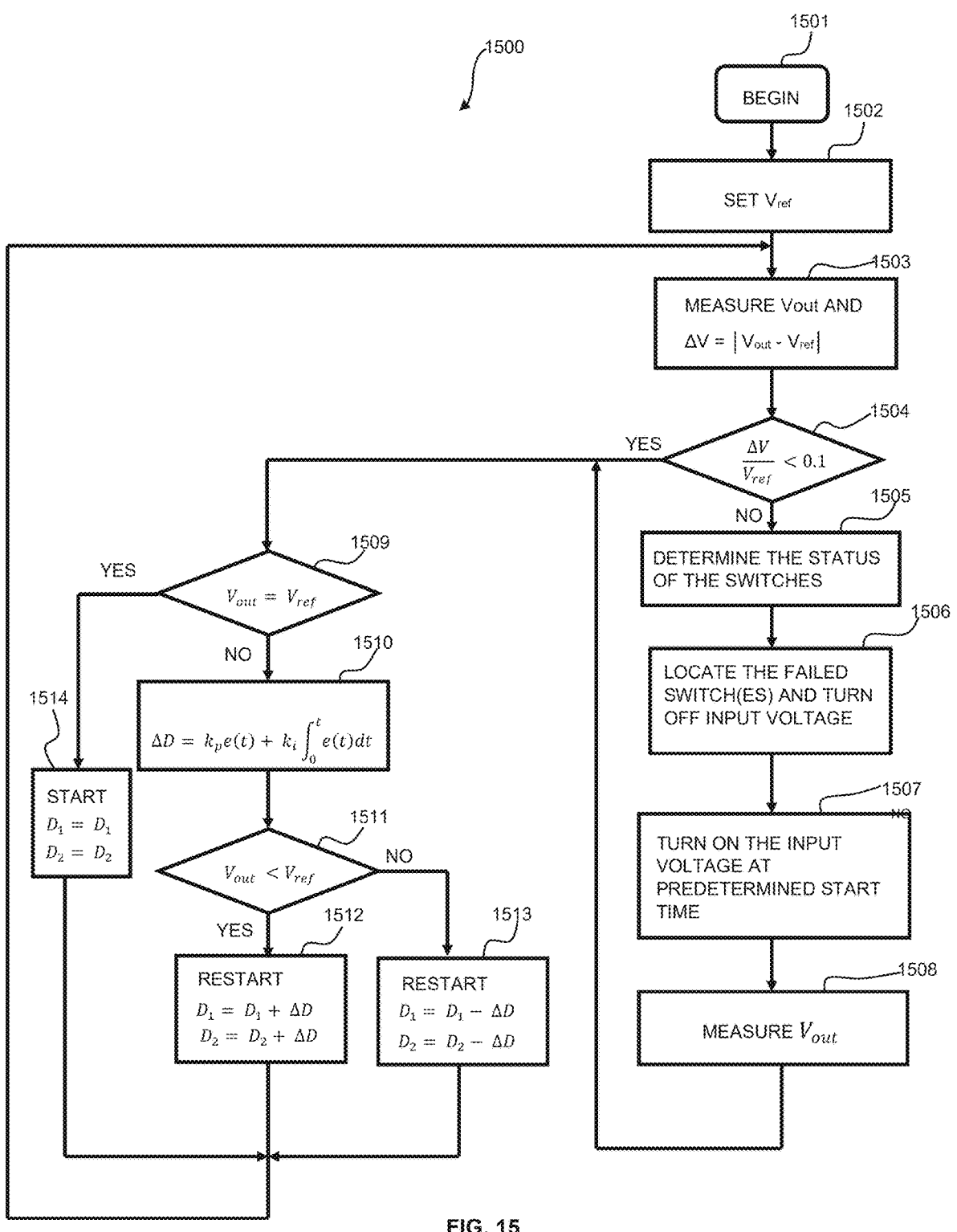
FIG. 15 shows a flowchart of an algorithm when executed by the controller circuit ensures the DC-DC boost circuit operates properly in accordance with an exemplary aspect of the present invention.

Referring finally to FIG. 15, a flowchart of an algorithm 1500 for ensuring the boost converter circuit operates reliably. Algorithm 1500 is executed by controller circuit 102. In various embodiments of the present invention, algorithm 1500 is a proportional integral (PI) algorithm. As shown in FIG. 1, V$_{ref}$ is a feedback signal from the output of converter circuit 200. Algorithm 1500 is executed when V$_{ref}$ notifies that converter circuit 200 fails to operate as described above in FIG. 3 to FIG. 13A-FIG. 13B. This PI algorithm 1500 when executed will perform the following steps:

At step 1501, algorithm 1500 begins.

At step 1502, converter constants and $V_{ref}$ are set up. Proportional gain $k_p$ is set at 0.000008; integral gain $k_i$=0.00000002. In addition, other variables are also declared and set up.

$V_{bus}$: current error of DC-DC boost converter.

$V_{busprev}$: previous error of the system (to calculate the integral component).

Integral: integral value of the error.

$V_{ref}$=311: reference voltage value of DC-DC boost converter.

k=300: overall gain.

At step 1503, output voltage $V_{out}$ and error voltage $\Delta V=|V_{out}-V_{ref}|$ are calculated. Other signals are also calculated: $V_{bus}=V_{ref}-x_1$. Integral=integral+$V_{bus}*k_i+V_{busprev}*k_i$. The current error and the previous error are added, then multiply by the integral gain. Previous error are updated $V_{busprev}=V_{bus}$ and then saved as current error value for use in the next calculation. Control signal ($y_1$) is also calculated: $y_1=(V_{bus}*k_p)$+integral: multiply the error by the proportional gain and add the integral component. If ($y_1$>0.8) $y_1$=0.8: If the control signal exceeds 0.8, limit it to 0.8. If ($y_1$<0.2) $y_1$=0.2: If the control signal is less than 0.2, limit it to 0.2. Control signal $y_1$ is amplified $y_1=y_1*k$ by multiplying the control signal $y_1$ with the overall amplification factor k. Then set $y_2=x_2$; $y_3=x_3$; and $y_4=x_4$ Next, at step 1504, whether the ratio $$\frac{\Delta V}{V_{ref}} < 0.1$$

is determined.

At step 1505, if the ratio is greater than 0.1, the operational status of MOSFET switches is determined. Step 1505 is realized by photodiodes 225, 245, 265, and 285 respectively.

At step 1506, failed MOSFET switch(es) is determined. Step 1506 is realized by photodiodes 225, 245, 265, and 285 respectively.

At step 1507, the switching control voltages $SW_1$-$SW_4$ are turned on at a predetermined start time.

At step 1508, output voltage $V_{out}$ is measured again.

At step 1509, the output voltage $V_{out}$ and the reference voltage $V_{ref}$ are compared.

At step 1510, if these voltages are not the same, the differential duty cycle $$\Delta D = k_p e(t) + k_i \int_0^\tau e(t)dt$$

is calculated; where e(t) is the error voltage between output voltage $V_{out}$ and the reference voltage $V_{ref}$.

Next at step 1511, the output voltage $V_{out}$ and the reference voltage $V_{ref}$ are compared again.

At step 1512, if the output voltage $V_{out}$ is less than the reference voltage $V_{ref}$ then new duty cycles D is set by adding previous duty cycle to the differential duty cycle $\Delta D$. That is, $D_1=D_1+\Delta D$ and $D_2=D_2+\Delta D$.

At step 1513, otherwise, if output voltage $V_{out}$ is greater than the reference voltage $V_{ref}$ then new duty cycles D are set by subtracting from previous duty cycle to the differential duty cycle $\Delta D$ from previous duty cycle. That is, $D_1=D_1-\Delta D$ and $D_2=D_2-\Delta D$.

Finally, at step 1514, when the output voltage $V_{out}$ is the same as the reference voltage $V_{ref}$, then maintain the same duty cycle D.

Although the implementation options of the present invention are disclosed through the detailed description of the invention above, however, it should be understood that the invention is by no means limited to these implementation options. Experts in the same technical field admit that many other similar changes and arrangements could be made. Therefore, the scope of the invention is clearly defined to include all similar changes and arrangements within the scope of the following attached claims.

REFERENCES

Y. Kog, Y. Birbir, and H. Bodur, "Non-isolated high step-up DC/DC converters—An overview," Alexandria Engineering Journal, vol. 61, no. 2, pp. 1091-1132, 2022.

F. A. Abbas, T. A. Abdul-Jabbar, A. A. Obed, A. Kersten, M. Kuder, and T. Weyh, "A Comprehensive Review and Analytical Comparison of Non-Isolated DC-DC Converters for Fuel Cell Applications," Energies, vol. 16, no. 8, p. 3493, 2023.

H. Tarzamni et al. also synthesized and compared the applicability of non-isolated high step-up DC-DC converters (H. Tarzamni, H. S. Gohari, M. Sabahi, and J. Kyyrs, "Non-isolated high step-up dc-dc converters: comparative review and metrics applicability," IEEE Transactions on Power Electronics, 2023).

V.-A. Truong, X.-T. Luong, P.-T. Nguyen, and T.-H. Quach, "The Improvement Switching Technique for High Step-Up DC-DC Boost Converter," Electronics, vol. 9, no. 6, p. 981, 2020.

What is claimed is:

1. A DC-DC step-up converter circuit, comprising:

a plurality of DC-DC boost converter stages coupled together in parallel having a common node operative to receive an input signal ($V_{in}$);

a controller circuit, electrically coupled to drive said plurality of DC-DC boost stages, wherein said controller circuit drives said plurality of DC-DC boost converter stages by a plurality of control signals ($SW_i$) that are 180° out of phase between consecutive DC-DC boost converter stages and each stage has a gain k equals to $$\frac{N}{1-D},$$

where N is the number of DC-DC boost converter stages and D is the duty cycle of said controlling signals ($SW_i$); wherein said duty cycle D is between 0.5 and 1.0 and N is an even positive integer number (N=2i where i is a positive non-zero integer) greater than 2 so that an output voltage ($V_{out}$) of said plurality DC-DC boost converter stage remains constant at $$\frac{NVs}{1-D}$$

as long as at least one of said DC-DC boost converter circuits operate, wherein each of said plurality of DC-DC boost converter stages further comprises:

an inductor having a first terminal coupled to receive said input signal $V_{in}$;

an electrical fuse coupled to a second terminal of said inductor;

a switch coupled to said electrical fuse:

a diode coupled to the second terminal of said inductor;

a resistor coupled to said switch; and a photodiode coupled to said resistor.

2. The DC-DC step-up converter circuit of claim 1 further comprising feedback circuit operative to control said controller circuit using a reference voltage $V_{REF}$.

3. The DC-DC step-up converter circuit of claim 2 wherein wherein said feedback circuit causes said controller circuit to issue said control signals ($SW_i$) wherein said reference voltage ($V_{REF}$) is a difference between said output voltage ($V_{OUT}$) and a predetermined reference voltage ($V_{OUTREF}$).

4. The DC-DC step-up converter circuit of claim 3 wherein said plurality of DC-DC boost converter stages comprises four DC-DC boost converter stages (N=4).

5. The DC-DC step-up converter circuit of claim 4 wherein said plurality of DC-DC boost converter stage further comprises a first DC-DC boost converter stage which comprises:

a first inductor having a first terminal coupled to said input voltage $V_{in}$;

a first electrical fuse coupled to a second terminal of said first inductor;

a first switch coupled to said electrical fuse, wherein said first switch is driven by a first control voltage $SW_1$; and a first rectifying diode coupled to the second terminal of said first inductor.

6. The DC-DC step-up converter circuit of claim 5 wherein said first switch is selected from a semiconductor device consisting of MOSFET (Metal-Oxide-Semiconductor Field-Effect Transistor); JFET (Junction Field-Effect Transistor); MESFET (Metal-Semiconductor Field-Effect Transistor); IGBT (Insulated Gate Bipolar Transistor)—and wherein said controller circuit is a proportional integral derivative (PI) controller.

7. The DC-DC step-up converter circuit of claim 6 wherein said-proportional integral derivative (PI) controller characterized by a proportional constant $k_p$, an integral gain $k_j$, when said output voltage $V_{out}$ is different from said reference voltage $V_{ref}$ by an amount $$\frac{\Delta V}{V_{ref}} > 0.1$$

then adjusting said duty cycle by an amount of $\Delta D$, wherein $$\Delta D = k_p e(t) + k_i \int_0^T e(t)dt,$$

wherein e(t) is an error signal proportional to e(t) $=|V_{ref}-V_{out}|$, and wherein $k_p$ is a preselected constant.

8. The DC-DC step-up converter circuit of claim 7 wherein said plurality of DC-DC boost converter stage further comprises a second DC-DC boost converter stage which comprises:

a second inductor having a first terminal coupled to said input voltage $V_{in}$;

a second electrical fuse coupled to a second terminal of said second inductor;

a second switch coupled to said electrical fuse, wherein said second switch is driven by a second driving signal $SW_2$ that is 180° out of phase with respect to said first driving signal $SW_1$;

a first capacitor coupled to the second terminal of said second inductor;

a second diode coupled in parallel to said capacitor; and a second rectifying diode coupled in series to said first capacitor and the anode of said second diode.

9. The DC-DC step-up converter circuit of claim 8 wherein said second switch is selected from a semiconductor device consisting of MOSFET (Metal-Oxide-Semiconductor Field-Effect Transistor); JFET (Junction Field-Effect Transistor); MESFET (Metal-Semiconductor Field-Effect Transistor); IGBT (Insulated Gate Bipolar Transistor).

10. The DC-DC step-up converter circuit of claim 9, wherein said second DC-DC boost converter stage further comprises:

a second resistor coupled to said second switch; and a second photo diode coupled to said second resistor.

11. The DC-DC step-up converter circuit of claim 10 wherein said plurality of DC-DC boost converter stage further comprises a third DC-DC boost converter stage which comprises:

a third inductor having a first terminal coupled to said input voltage $V_{in}$;

a third electrical fuse coupled to a second terminal of third second inductor;

a third switch coupled to said electrical fuse, wherein said third switch is driven by a third driving signal $SW_3$ that is 180° out of phase with respect to said second driving signal $SW_2$;

a second capacitor coupled to the second terminal of said third inductor;

a second diode coupled in parallel to said second capacitor; and a second rectifying diode coupled in series to said second capacitor and the anode of said second diode.

12. The DC-DC step-up converter circuit of claim 11 wherein said third switch is selected from a semiconductor device consisting of MOSFET (Metal-Oxide-Semiconductor Field-Effect Transistor); JFET (Junction Field-Effect Transistor); MESFET (Metal-Semiconductor Field-Effect Transistor); IGBT (Insulated Gate Bipolar Transistor).

13. The DC-DC step-up converter circuit of claim 12, wherein said third DC-DC boost converter stage further comprises:

a third resistor coupled to said third switch; and a third diode coupled to said third resistor.

14. The DC-DC step-up converter circuit of claim 13 wherein said plurality of DC-DC boost converter stage further comprises a fourth DC-DC boost converter stage which comprises:

a fourth inductor having a first terminal coupled to said input voltage $V_{in}$;

a fourth electrical fuse coupled to a second terminal of said fourth inductor;

a fourth switch coupled to said electrical fuse, wherein said fourth switch is driven by a fourth driving signal $SW_4$ that is 180° out of phase with respect to said third driving signal $SW_3$;

a third capacitor coupled to the second terminal of said fourth inductor;

a third diode coupled in parallel to said third capacitor; and a fourth rectifying diode coupled in series to said third capacitor and the anode of said second directional diode.

15. The DC-DC step-up converter circuit of claim 14 wherein said fourth switch is selected from a semiconductor device consisting of MOSFET (Metal-Oxide-Semiconductor Field-Effect Transistor); JFET (Junction Field-Effect Transistor); MESFET (Metal-Semiconductor Field-Effect Transistor); IGBT (Insulated Gate Bipolar Transistor).

16. The DC-DC step-up converter circuit of claim 15, wherein said second DC-DC boost converter stage further comprises:

a fourth resistor coupled to said fourth switch; and
a fourth diode coupled to said fourth resistor.

* * * * *